US012273720B2

(12) United States Patent
Bud et al.

(10) Patent No.: US 12,273,720 B2
(45) Date of Patent: Apr. 8, 2025

(54) AUTOMATED PAIRING OF DEVICES BASED ON PROXIMITY DETECTION

(71) Applicant: Microsoft Technology Licensing, LLC, Redmond, WA (US)

(72) Inventors: Joel Ephraim Bud, Tel Aviv (IL); Arie Yehuda Gur, Kiryat Ono (IL); Oren Istrin, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 336 days.

(21) Appl. No.: 17/854,542

(22) Filed: Jun. 30, 2022

(65) Prior Publication Data

US 2024/0007862 A1 Jan. 4, 2024

(51) Int. Cl.
*H04W 12/50* (2021.01)
*H04W 4/80* (2018.01)
(Continued)

(52) U.S. Cl.
CPC .............. *H04W 12/50* (2021.01); *H04W 4/80* (2018.02); *H04W 12/04* (2013.01); *H04W 76/14* (2018.02)

(58) Field of Classification Search
CPC ..... H04W 12/50; H04W 12/04; H04W 76/14; H04W 4/80
(Continued)

(56) References Cited

U.S. PATENT DOCUMENTS

| 7,813,715 | B2 | 10/2010 | Mckillop |
| 8,073,984 | B2 | 12/2011 | Lydon et al. |

(Continued)

FOREIGN PATENT DOCUMENTS

| CA | 3099553 C | * | 6/2021 | ......... G07C 9/00309 |
| WO | WO-2014033199 A1 | * | 3/2014 | ........... H04L 63/062 |
| WO | 2021233785 A1 | | 11/2021 | |

OTHER PUBLICATIONS

"International Search Report and Written Opinion Issued in PCT Application No. PCT/US23/022480", Mailed Date: Sep. 5, 2023, 14 Pages.
(Continued)

*Primary Examiner* — Mong-Thuy T Tran
(74) *Attorney, Agent, or Firm* — Weaver IP L.L.C.

(57) ABSTRACT

Devices are automatically paired (e.g., without user involvement) for wireless communication based on proximity. A first device may authorize (e.g., wired or wireless) bridge device(s) to participate in (e.g., initiate) pairing first and second devices. The first or bridge devices engage in wireless proximity communication with second device(s), indicating the second device(s) is(are) physically co-located with the first or bridge devices. Co-location is used to initiate automated pairing of the first and second devices. The second device provides a pairing address to the first device (e.g., through the bridge device). The first device provides a temporary security key for a secure channel between the first and second devices (e.g., through the bridge device). A non-temporary security key is provided by the first device to the second device (e.g., through the bridge device) over the secure channel. The first and second devices complete automated wireless pairing using the non-temporary security key.

20 Claims, 8 Drawing Sheets

(51) Int. Cl.
  *H04W 12/04*   (2021.01)
  *H04W 76/14*   (2018.01)
(58) Field of Classification Search
  USPC ......................................................... 455/41.2
  See application file for complete search history.

(56) References Cited

U.S. PATENT DOCUMENTS

| | | |
|---|---|---|
| 8,078,787 B2 | 12/2011 | Lydon et al. |
| 8,117,651 B2 | 2/2012 | Novotney et al. |
| 8,527,688 B2 | 9/2013 | Chatterjee et al. |
| 8,750,799 B2 | 6/2014 | Giles et al. |
| 8,850,196 B2 | 9/2014 | Blanco et al. |
| 9,226,101 B1 * | 12/2015 | Ludwig ............. H04M 3/42348 |
| 2003/0220988 A1 | 11/2003 | Hymel |
| 2019/0028445 A1 | 1/2019 | Mclaughlin et al. |
| 2020/0312072 A1 * | 10/2020 | Myers .................... H04W 4/80 |
| 2022/0004537 A1 * | 1/2022 | Haddon ................... H04L 1/16 |
| 2022/0032073 A1 | 2/2022 | Baumgartner et al. |
| 2022/0159471 A1 | 5/2022 | Li et al. |
| 2022/0201483 A1 * | 6/2022 | Maragoudakis ........ H04W 4/80 |
| 2023/0353917 A1 * | 11/2023 | Goh ...................... H04W 84/18 |
| 2024/0285956 A1 * | 8/2024 | Forsell ............... A61N 1/37254 |

OTHER PUBLICATIONS

Juturu, et al., "Intelligent Bluetooth Device to Device Connection Shift", In Proceedings of IEEE Wireless Communications and Networking Conference, May 25, 2020, 5 Pages.

* cited by examiner

AUTOMATED PAIRING OF DEVICES BASED ON PROXIMITY DETECTION

BACKGROUND

Pairing devices (e.g., Bluetooth® devices) involves manual user effort, e.g., often involving reading instructions, one or more button-press operations to place a device in a pairing mode, and one or more menu operations, sometimes ending without success. For example, pairing Bluetooth® devices may force a user to find the right menu, navigate the menu to configure the devices into pairing mode, wait to see if pairing works, and provide a confirmation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for automated pairing of devices based on a proximity detection. First and second devices may be automatically paired (e.g., without user involvement) for wireless communication (e.g., Bluetooth®), for example, based on proximity detection of the second device by the first device or a bridge device. A first (e.g., primary) device may authorize (e.g., pair with) one or more (e.g., wired or wireless) bridge devices to participate (e.g., initiate) pairing of the first device with one or more second devices. The first device or the bridge device may engage in a wireless proximity communication with one or more second (e.g., secondary) devices, indicating that the second device(s) is(are) physically co-located with the first device or bridge device. The co-location indication may be used to initiate the automated pairing of the first and second devices. The second device may provide a pairing address to the first device (e.g., through the bridge device). The first device may provide a temporary security key, which may be used to create a secure channel between the first and second devices (e.g., through the bridge device). A non-temporary security key for pairing may be provided by the first device to the second device (e.g., through the bridge device) over the secure channel. The first and second devices may complete the automated pairing using the non-temporary security key. Time limits may be imposed on the temporary and/or non-temporary security keys.

In examples, the second device may include a wireless proximity transceiver (e.g., electrostatic (ES) or near-field communication (NFC) transceiver) and wireless pairing transceiver. A first device may include a wireless pairing transceiver and at least one of a wireless proximity transceiver and a wired or wireless bridge transceiver. A bridge device may include a wireless proximity transceiver for communication with the second device and a wired or wireless bridge transceiver for communication with the first device. In some examples, the bridge transceiver and the wireless pairing transceiver may be the same transceiver.

Further features and advantages of the subject matter (e.g., examples) disclosed herein, as well as the structure and operation of various embodiments, are described in detail below with reference to the accompanying drawings. It is noted that the present subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
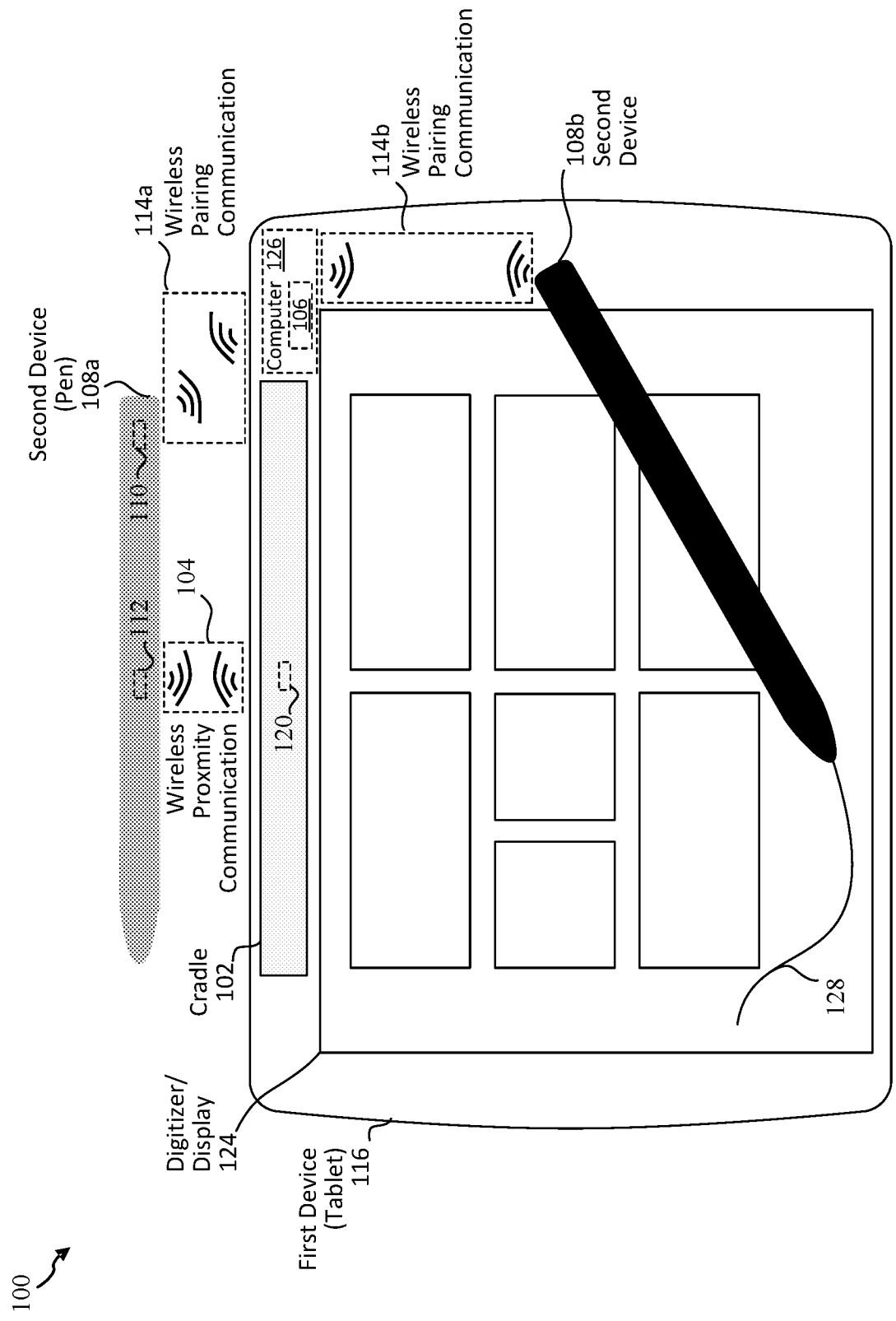
FIG. 1 shows an example of automated pairing of devices based on a proximity detection without a bridge device, according to an example embodiment.

The features and advantages of the examples disclosed will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the various examples. The scope of the present subject matter is not limited to the disclosed embodiments. The disclosed embodiments merely exemplify the various examples, and modified versions of the disclosed embodiments are also encompassed by the present subject matter. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

II. Example Implementations

Methods, systems, and computer program products are provided for automated pairing of devices based on a proximity detection. A proximity detection may indicate a user intention to pair devices and provide security with short range wireless communication. First and second devices may be automatically paired (e.g., without user involvement) for wireless communication (e.g., Bluetooth®), for example, based on proximity detection of the second device by the first device or a bridge device. A first (e.g., primary) device may authorize (e.g., pair with) one or more (e.g., wired or wireless) bridge devices to participate (e.g., initiate) pairing of the first device with one or more second devices. The first device or the bridge device may engage in a wireless proximity communication with one or more second (e.g., secondary) devices, indicating that the second device(s) is(are) physically co-located with the first device or bridge device. The co-location indication may be used to initiate the automated pairing of the first and second devices. The second device may provide a pairing address to the first device (e.g., through the bridge device), for example, for wireless pairing with the first device and/or to generate one or more security keys. The first device may provide a temporary security key, which may be used to create and/or communicate over a secure channel between the first and second devices (e.g., through the bridge device). A non-temporary security key for pairing may be provided by the first device to the second device (e.g., through the bridge device) over/using the secure channel. The first and second devices may complete the automated pairing using the non-temporary security key. Time limits may be imposed on the temporary and/or non-temporary security keys. Such embodiments may be implemented in various configurations, for example, as shown and discussed relative to FIGS. 1-10.

FIG. 1 shows an example of automated pairing of devices based on a proximity detection without a bridge device, according to an example embodiment. FIG. 1 shows an example environment 100 for implementation of automated pairing of devices based on a proximity detection without a bridge device. Example environment 100 shows a first device 116 and a second device 108, which may be, for example, a primary device and a secondary (e.g., an accessory) device, respectively. For example, first device 116 may be a tablet computer, which may include a wireless charging (WLC) device. Second device 108 (e.g., shown in several positions 108a, 108b) may be a pen accessory, which may include a chargeable device. Example environment 100 presents one of many possible examples of first and second devices 116, 108, which may be any wireless pairable devices.

First device 116 may include, for example, a computer 126, a digitizer 124 (e.g., display, touchscreen), and a cradle 102. In examples, computer 126 may include one or more applications, operating systems, virtual machines (VMs), storage devices, etc., that may be executed, hosted, and/or stored therein or via one or more other computing devices via network(s) (not shown). In various examples, computer 126 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computer 126 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 10.

Computer 126 may include and/or control display 124. Display 124 may comprise a touchscreen that detects user touch and the proximity/touch of second device (e.g., pen) 108, as shown by a line 128 drawn on display 124 by second device 108 (e.g., in position 108b).

Computer 126 may control pairing-based and proximity-based communication transmitted and received by first device 116. Computer 126 may include and/or control a wireless pairing transceiver 106, for example, using a wireless pairing communication controller. Wireless pairing transceiver 106 may be, for example, a Bluetooth® transceiver, a Zigbee® transceiver, ultra-wide band (UWB) transceiver, etc. Computer 126 may (e.g., via wireless pairing transceiver 106) engage in wireless pairing/paired communication with second device 108. Computer 126 may include and/or control operation of cradle 102, for example, using a WLC controller. Cradle 102 may (e.g., be configured to) engage in wireless power and data communication. Cradle 102 may include a wireless proximity transceiver 120. Wireless proximity transceiver 120 may be configured to engage in proximity-based communications by transmitting with a WLC transmitter (Tx) and receiving with a WLC receiver (Rx). Wireless proximity transceiver 120 may be, for example, an NFC transceiver, an RFID transceiver, etc.

Second device 108 may be an accessory pen that a user may use to point, select, write, draw 128, etc. "on" first device (e.g., tablet computer) 116. Second device 108 may include a wireless proximity transceiver 112 and a wireless paired transceiver 110. Second device 108 may control wireless pairing transceiver 110, for example, using a wireless pairing communication controller. Wireless pairing transceiver 110 may be, for example, a Bluetooth® transceiver, a Zigbee® transceiver, etc. Second device 108 may (e.g., via wireless pairing transceiver 110) engage in wireless pairing/paired communication 114a, 114b with first device 116. Second device 108 may control wireless proximity transceiver 112. Wireless proximity transceiver 112 may be configured to engage in wireless proximity-based communication 104 by transmitting with a WLC transmitter (Tx) and receiving with a WLC receiver (Rx). Wireless proximity transceiver 112 may be, for example, an NFC transceiver, an RFID transceiver, etc.

First device 116 and second device 108 may (e.g., be configured to) engage in wireless proximity communication 104 and wireless pairing communication 114a, 114b. Proximity-based communication may indicate second device 108 is in close proximity to first device 116. First device 116 may perform wireless proximity communication 104, for example, using wireless proximity transceiver 120 and wireless proximity transceiver 112. For example, first device 116 and second device 108 may communicate (e.g., power and/or data) using proximity-based communication (e.g., near-field communication (NFC)). First device 116 may perform wireless pairing/paired communication 114 (e.g., 114a, 114b) via wireless paired transceiver 106 and wireless paired transceiver 110. For example, first device 116 and second device 108 may communicate using wireless pairing communication 114a, 114b for communication at longer distances and/or for higher bandwidth communication.

Device pairing for wireless pairing communication 114a, 114b (e.g., for communication to pair and communication after pairing) may be initiated based on wireless proximity communication 104 between first device 116 and second device 108. For example, first device 116 and second device 108 may engage in proximity-based communication (e.g., NFC) if/when second device 108 is at or near position 108a so that proximity communication transceiver 112 in second device 108 is within communication range near proximity transceiver 120 in second device 108. Wireless proximity communication 104 may indicate that second device 108 is physically co-located with first device 116. The co-location indication may be used to initiate the automated pairing of the first and second devices 116, 108. For example, first device 116 may use wireless proximity communication 104 to initiate wireless pairing (e.g., wireless pairing communication 114a) between first device 116 and second device 108 (e.g., if first and second devices 116, 108 are not already paired). In some examples, second device 108 may use wireless proximity communication 104 to provide a pairing address to first device 116. First device 116 may provide a temporary security key, which may be used to create a secure channel between first and second devices 116, 108. A non-temporary security key for pairing may be provided by first device 116 to second device 108 over the secure channel. A secure channel may be created over a direct communication between first and second devices. First and second devices 116, 108 may complete the automated pairing using the non-temporary security key in wireless pairing communication 114a.

Figure 2:
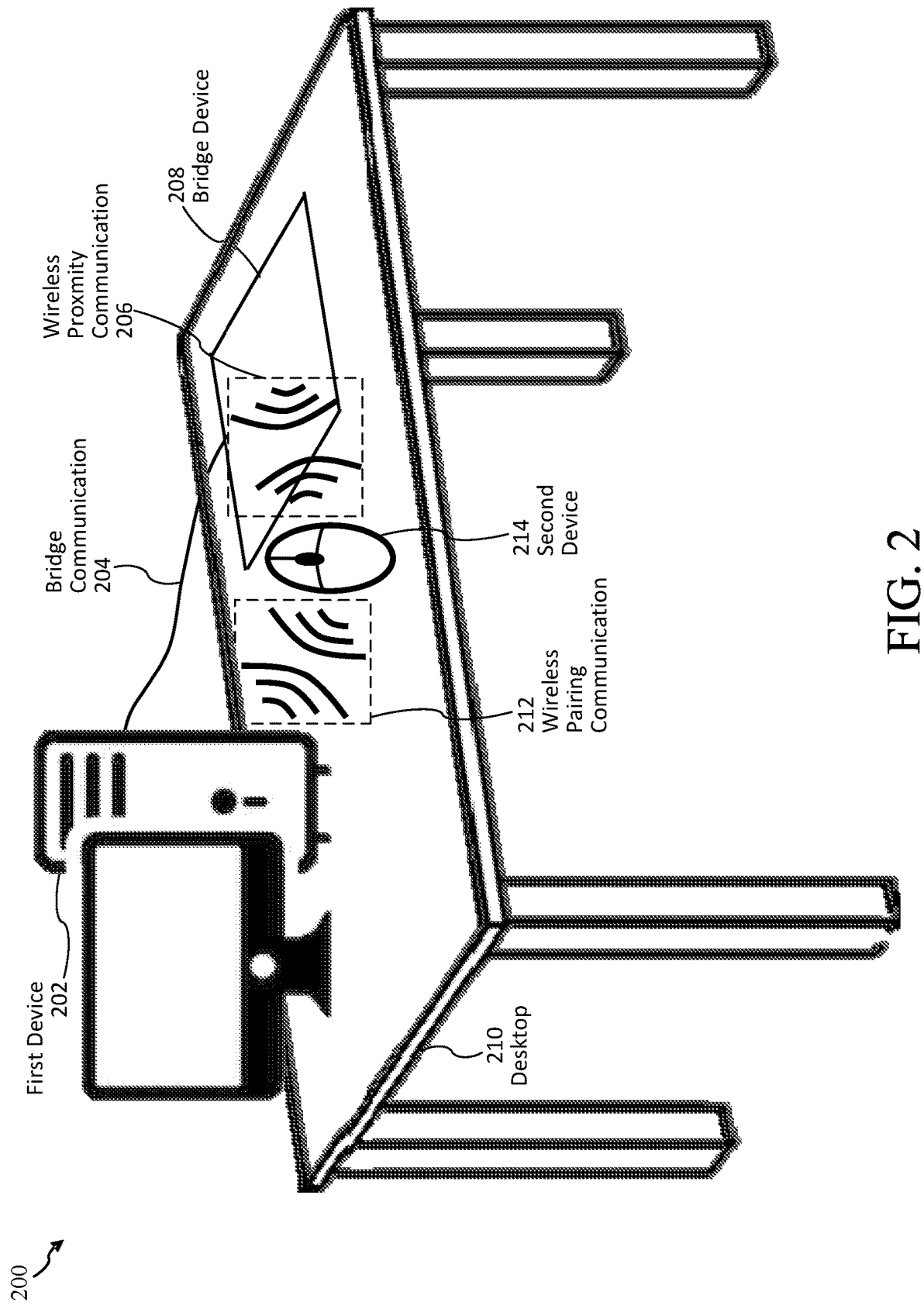
FIG. 2 shows an example of automated pairing of devices based on a proximity detection with a wired bridge device, according to an example embodiment.

FIG. 2 shows an example of automated pairing of devices based on a proximity detection with a wired bridge device, according to an example embodiment. FIG. 2 shows an example environment 200 for implementation of automated pairing of devices based on a proximity detection with a wired bridge device. Example environment 200 shows a first device 202, a second device 214, and a bridge device 208 on a desktop 210. First device 202 and second device 214 may be, for example, a primary device and a secondary (e.g., an accessory) device, respectively. For example, first device 202 may be a desktop computer. Second device 214 may be a mouse accessory. Example environment 200 presents one of many possible examples of first and second devices 202, 214, which may be any wireless pairable devices. Bridge device 208 may be used to support automated pairing of first and second devices 202, 214.

First device 202 may be a desktop computer, which have one or more applications, operating systems, virtual machines (VMs), etc., that may be executed, hosted, and/or stored therein or via one or more other computing devices via network(s) (not shown). In various examples, first device 202 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. First device 202 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 10.

Figure 4:
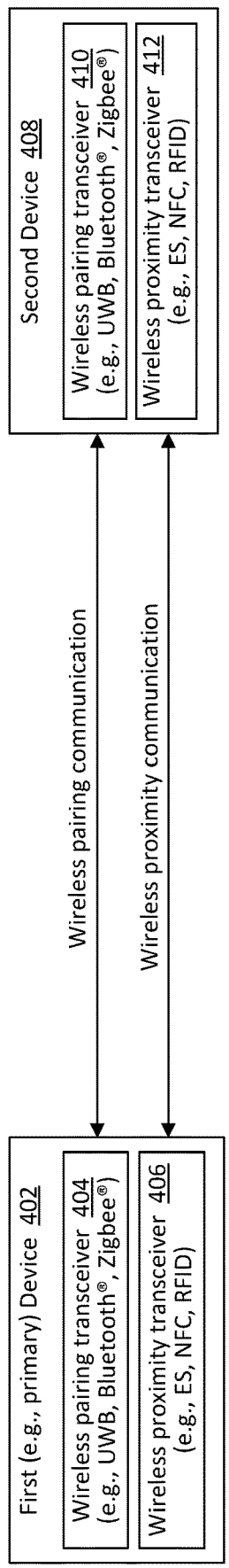
FIG. 4 shows an example of first and second devices configured for automated pairing based on a proximity detection, according to an example embodiment.
Figure 5:
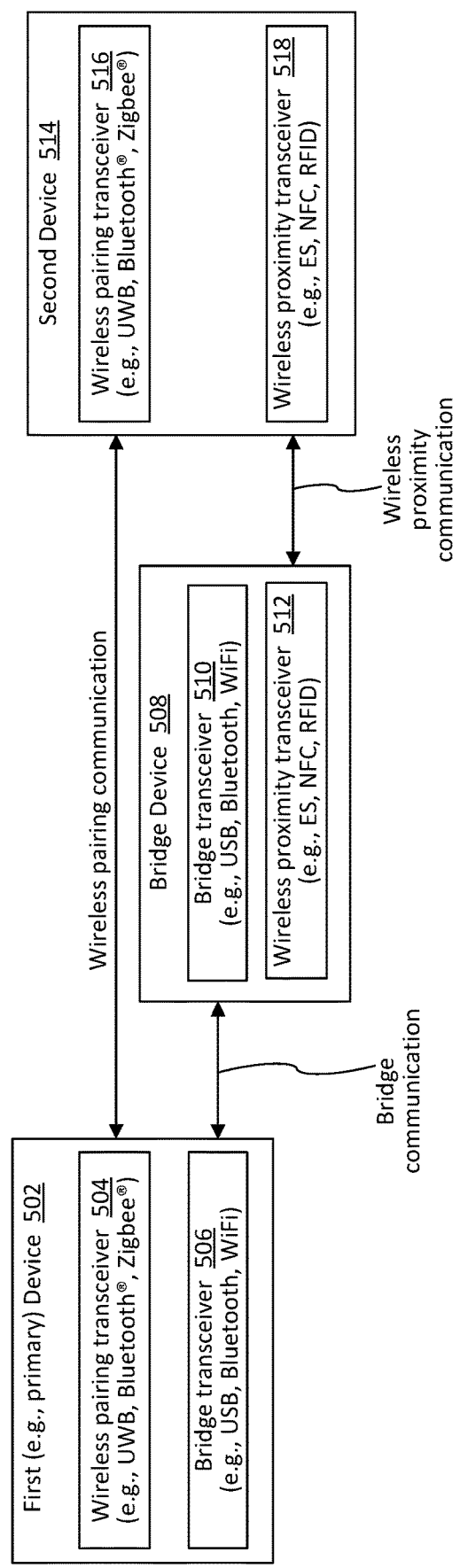
FIG. 5 shows an example of first, second and bridge devices configured for automated pairing based on a proximity detection, according to an example embodiment.

First device 202 may include multiple transceivers. First device 202 may include a first transceiver (e.g., as shown in FIG. 5). The first transceiver may comprise a wireless pairing transceiver, such as a wireless LAN or PAN transceiver, e.g., a Bluetooth® transceiver, a Zigbee® transceiver, a UWB transceiver, etc. First device 202 may include a bridge transceiver (e.g., as shown in FIG. 5). The bridge transceiver may comprise a wired or wireless bridge transceiver, such as a wired or wireless LAN or PAN transceiver, e.g., a universal serial bus (USB) transceiver, a WiFi transceiver, an ethernet transceiver, a wireless pairing transceiver, such as a Bluetooth® transceiver, a Zigbee® transceiver, a UWB transceiver, etc. First device 202 may include a second transceiver e.g., as shown in FIG. 4). The second transceiver may comprise a wireless proximity transceiver, such as an NFC transceiver, an RFID transceiver, an electrostatic (ES) transceiver, etc. An example of an ES transceiver may be implemented, for example, by Microsoft® pen protocol (MPP).

Second device 214 may be, for example, a mouse or other pointing, selecting, and/or drawing device. Other examples of second device 214 include, for example, a wireless keyboard, headphones, camera, printer, smart watch, smart phone, pen, speakers, etc. Second device 214 may include multiple transceivers. Second device 214 may include a first transceiver (e.g., as shown in FIGS. 4 and 5). The first transceiver may comprise a wireless pairing transceiver, e.g., a wireless LAN or PAN transceiver, such as a Bluetooth® transceiver, a Zigbee® transceiver, a UWB transceiver, etc. Second device 214 may include a second transceiver e.g., as shown in FIGS. 4 and 5). The second transceiver may comprise a wireless proximity transceiver, such as an NFC transceiver, an RFID transceiver, an ES transceiver, etc.

Bridge device 208 may be a secondary (e.g., an accessory) device. For example, bridge device 208 may be a docking station, a mouse tracking pad, a digitizer, a connection mat, a gaming device (e.g., XBOX® controller), a remote control, a smart phone, etc. Other examples of bridge device 208 include, for example, a smart phone, tablet, RFID scanner, TV remote control, keyboard surface, table surface, etc. In the example shown, bridge device 208 may be wired to first device 202. Bridge device 208 may be configured or configurable to be authorized (e.g., by first device 202) to participate in the automated pairing of first and second devices 202, 214. In some examples, multiple bridge devices may support pairing for a single first (e.g., primary) device. In some examples, a bridge device may support pairing for multiple first (e.g., primary) devices. For example, a smart phone may serve as a bridge device for a TV and a computer. In other examples, a single device may include the features of both bridge device 208 and second device 214, such that the device may operate as bridge device 208 in some scenarios and as second device 214 in others.

Bridge device 208 may be used, for example, if first device 202 lacks a wireless proximity communication transceiver, for improved security (e.g., by placing bridge device 202 in a secure location accessible by an authorized user of first device 202, and/or for a more convenient pairing point for a user than first device 202 (e.g., if the first device 202 is too far away or inaccessible). Similarly, first device 202 may be placed in a secure location (e.g., for automated pairing without a bridge device). In some examples, the type and/or power level of proximity communication may be limited based on the area of secure location of bridge device 208 and/or first device 202 (e.g., to prevent unauthorized automated pairing of devices). Bridge device 208 may be authorized (e.g., paired with) first device 202, for example, before first device 202 is paired with second device 214. Bridge device 208 may include multiple transceivers. Bridge device 208 may include a bridge transceiver (e.g., as shown in FIG. 5). The bridge transceiver may comprise a wired or wireless bridge transceiver, such as a wired or wireless LAN or PAN transceiver, e.g., a USB transceiver, a WiFi transceiver, an ethernet transceiver, a wireless pairing transceiver, such as a Bluetooth® transceiver, a Zigbee® transceiver, a UWB transceiver, etc. Bridge device 208 may include a second transceiver e.g., as shown in FIG. 5). The second transceiver may comprise a wireless proximity transceiver, such as an NFC transceiver, an RFID transceiver, an ES transceiver, etc.

First device 202 and second device 214 may engage in wireless pairing/paired communication 212 (e.g., via wireless pairing transceivers). First device 202 and bridge device 208 may engage in wired bridge communication 204 (e.g., via bridge transceivers). Bridge device 208 and second device 214 may engage in wireless proximity communication 206 (e.g., via wireless proximity transceivers). Proximity-based communication between second device 214 and bridge device 208 may indicate second device 214 is in close proximity to bridge device 208.

Device pairing for wireless pairing communication 212 may be initiated based on wireless proximity communication 206 between second device 214 and bridge device 208 (e.g., if first and second devices 202, 214 are not already paired). For example, second device 214 and bridge device 208 may engage in proximity-based communication (e.g., NFC) if/when second device 214 and bridge device 208 are within wireless proximity communication range. Wireless proximity communication 206 may indicate that second device 214 is physically co-located with bridge device 208. The co-location indication may be used to initiate the automated pairing of the first and second devices 202, 214. For example, bridge device 208 may use wireless proximity communication 206 to initiate wireless pairing by performing bridge communication 204 with first device 202. In some examples, second device 214 may use wireless proximity communication 206 to provide a pairing address to bridge device 208. Bridge device 208 may provide the pairing address of second device 214 to first device 202 in bridge communication 204. First device 202 may provide a temporary security key to bridge device 208 in bridge communication 204. A temporary security key may be used to provide an added level of security in an automated wireless pairing process (e.g., in addition to proximity communication less likely to be intercepted). For example, a temporary security key may be generated based on the pairing address provided in a proximity communication by second device. Bridge device 208 may provide the temporary security key to second device 214. The temporary security key may be used to create a secure channel between the first and second devices 202, 214 (e.g., through bridge 208). A non-temporary security key for pairing may be provided by first device 202 to second device 214 over the secure channel through bridge 208, e.g., the temporary security key being used to provide security for passage of the non-temporary security key. First and second devices 202, 214 may complete the automated pairing using the non-temporary security key in wireless pairing communication 212.

Figure 3:
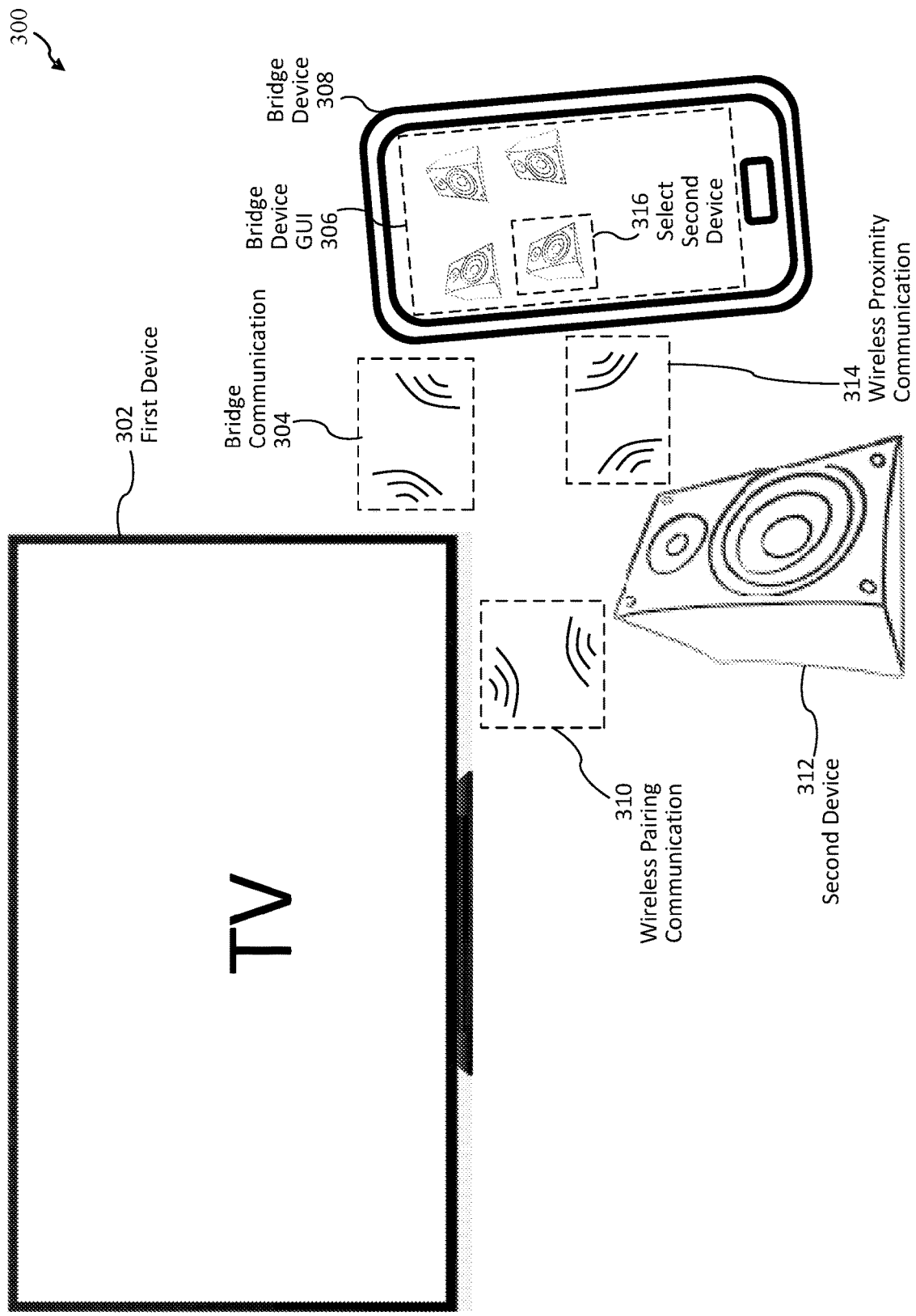
FIG. 3 shows an example of automated pairing of devices based on a proximity detection with a wireless bridge device, according to an example embodiment.

FIG. 3 shows an example of automated pairing of devices based on a proximity detection with a wireless bridge device, according to an example embodiment. FIG. 3 shows an example environment 300 for implementation of automated pairing of devices based on a proximity detection with a wireless bridge device. Example environment 300 shows a first device 302, a second device 312, and a bridge device 308. First device 302 and second device 312 may be, for example, a primary device and a secondary (e.g., an accessory) device, respectively. For example, first device 302 may be a television (TV). Second device 312 may be a speaker (e.g., to play TV sounds). Example environment 300 presents one of many possible examples of first and second devices 302, 312, which may be any wireless pairable devices. Bridge device 308 may be configured/used to support automated pairing of first and second devices 302, 312.

First device 302 may be a TV. First device 302 may include a computer, which may have one or more applications, operating systems, virtual machines (VMs), etc., that may be executed, hosted, and/or stored therein or via one or more other computing devices via network(s) (not shown). In various examples, first device 302 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. First device 302 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 10.

First device 302 may include multiple transceivers. First device 302 may include a first transceiver (e.g., as shown in FIG. 5). The first transceiver may comprise a wireless pairing transceiver, such as a wireless LAN or PAN transceiver, e.g., a Bluetooth® transceiver, a Zigbee® transceiver, a UWB transceiver, etc. First device 302 may include a bridge transceiver (e.g., as shown in FIG. 5). The bridge transceiver may comprise a wired or wireless bridge transceiver, such as a wired or wireless LAN or PAN transceiver, e.g., a USB transceiver, a WiFi transceiver, an ethernet transceiver, a wireless pairing transceiver, such as a Bluetooth® transceiver, a Zigbee® transceiver, a UWB transceiver, etc. First device 302 may include a second transceiver e.g., as shown in FIG. 4). The second transceiver may comprise a wireless proximity transceiver, such as an NFC transceiver, an RFID transceiver, an ES transceiver, etc.

Second device 312 may be, for example, a speaker. Other examples of second device 312 include, for example, a wireless keyboard, headphones, camera, printer, smart watch, smart phone, pen, mouse, etc. Second device 312 may include multiple transceivers. Second device 312 may include a first transceiver (e.g., as shown in FIGS. 4 and 5). The first transceiver may comprise a wireless pairing transceiver, e.g., a wireless LAN or PAN transceiver, such as a Bluetooth® transceiver, a Zigbee® transceiver, a UWB transceiver, etc. Second device 312 may include a second transceiver e.g., as shown in FIGS. 4 and 5). The second transceiver may comprise a wireless proximity transceiver, such as an NFC transceiver, an RFID transceiver, an ES transceiver, etc.

Bridge device 308 may be a primary or a secondary (e.g., an accessory) device. For example, bridge device 308 may be a smart phone. Other examples of bridge device 308 include, for example, a tablet, RFID scanner, TV remote control, keyboard surface, table surface, docking station, a mouse tracking pad, a digitizer, a connection mat, etc. In the example shown, bridge device 308 may lack a wired connection to each of first device 302 and second device 312. Bridge device 308 may be configured or configurable to be authorized (e.g., by first device 302) to participate in the automated pairing of first and second devices 302, 312. Bridge device 308 may be authorized (e.g., paired with) first device 302, for example, before first device 302 is paired with second device 312. Bridge device 308 may include multiple transceivers. Bridge device 308 may include a bridge transceiver (e.g., as shown in FIG. 5). The bridge transceiver may comprise a wired or wireless bridge transceiver, such as a wired or wireless LAN or PAN transceiver, e.g., a USB transceiver, a WiFi transceiver, an ethernet transceiver, a wireless pairing transceiver, such as a Bluetooth® transceiver, a Zigbee® transceiver, a UWB transceiver, etc. Bridge device 308 may include a second transceiver e.g., as shown in FIG. 5). The second transceiver may comprise a wireless proximity transceiver, such as an NFC transceiver, an RFID transceiver, an ES transceiver, etc.

First device 302 and second device 312 may engage in wireless pairing/paired communication 310 (e.g., via wireless pairing transceivers). First device 302 and bridge device 308 may engage in wireless bridge communication 304 (e.g., via bridge transceivers). Bridge device 308 and second device 312 may engage in wireless proximity communication 314 (e.g., via wireless proximity transceivers). Proximity-based communication between second device 312 and bridge device 308 may indicate second device 312 is in close proximity to bridge device 308.

Device pairing for wireless pairing communication 310 may be initiated based on wireless proximity communication 314 between second device 312 and bridge device 308 (e.g., if first and second devices 302, 312 are not already paired). For example, second device 312 and bridge device 308 may engage in proximity-based communication (e.g., NFC) if/when second device 312 and bridge device 308 are within wireless proximity communication range. Wireless proximity communication 314 may indicate that second device 312 is physically co-located with bridge device 308. The co-location indication may be used to initiate the automated pairing of the first and second devices 302, 312. For example, bridge device 308 may use wireless proximity communication 314 to initiate wireless pairing by performing bridge communication 304 with first device 302.

In some examples (e.g., as shown in FIG. 3), a user (not shown) may interact with bridge device 308 (e.g., smart phone). For example, a user may navigate a menu in a bridge device graphical user interface (GUI) 306, which may be related to setup or configuration of one or more second devices 312. The user may select (at 316) second device 312 (e.g., from among multiple second devices). Bridge device 308 may engage in wireless proximity communication 314 with selected second device 312 (e.g., instead of unselected second devices). In other examples, wireless proximity communication 314 may occur without user involvement (e.g., other than bringing bridge device 308 and second device 312 within range of wireless proximity communication 314).

In some examples, second device 312 may use wireless proximity communication 314 to provide a pairing address to bridge device 308. Bridge device 308 may provide the pairing address of second device 312 to first device 302 in bridge communication 304. First device 302 may provide a temporary security key to bridge device 308 in bridge communication 304. Bridge device 308 may provide the temporary security key to second device 312. The temporary security key may be used to create a secure channel between first and second devices 302, 312 (e.g., through bridge 308). A non-temporary security key for pairing may be provided by first device 302 to second device 312 over the secure channel through bridge 308. First and second devices 302, 312 may complete the automated pairing using the non-temporary security key in wireless pairing communication 310.

FIG. 4 shows an example of a first (e.g., primary) device 402 and a second (e.g., secondary) device 408 configured for automated pairing based on a proximity detection, according to an example embodiment. FIG. 4 shows an example of first and second devices 116, 118 in FIG. 1 configured for automated pairing based on proximity communication without a bridge device.

First device 402 may be any type of device, e.g., desktop computer, tablet computer, notebook computer, touch screen or pad, etc. First device 402 may include wireless pairing transceiver 404. Wireless pairing transceiver 404 may be, for example, a Bluetooth® transceiver, a Zigbee® transceiver, a UWB transceiver, etc. First device 402 may use wireless pairing transceiver 404 to engage in wireless pairing/paired communication with second device 408. First device 402 may include wireless proximity transceiver 406. Wireless proximity transceiver 406 may be, for example, an NFC transceiver, an RFID transceiver, an ES transceiver, etc. First device 402 may use wireless proximity transceiver 406 to engage in wireless proximity communication with second device 408.

Second device 408 may be any type of device, e.g., wireless keyboard, mouse, headphones, camera, printer, smart watch, smart phone, pen, speakers, etc. Second device 408 may perform pairing-based and proximity-based communication. Second device 408 may include wireless pairing transceiver 410. Wireless pairing transceiver 410 may be, for example, a Bluetooth® transceiver, a Zigbee® transceiver, a UWB transceiver, etc. Second device 408 may use wireless pairing transceiver 410 to engage in wireless pairing/paired communication with first device 402. Second device 408 may include wireless proximity transceiver 412. Wireless proximity transceiver 412 may be, for example, an NFC transceiver, an RFID transceiver, an ES transceiver, etc. Second device 408 may use wireless proximity transceiver 412 to engage in wireless proximity communication with first device 402.

As shown in FIG. 4, first device 402 and second device 408 may (e.g., be configured to) engage in wireless proximity communication and wireless pairing communication. Proximity-based communication between first and second devices 402, 408 may indicate second device 408 is in close proximity to first device 402. First and second devices 402, 408 may perform wireless proximity communication, for example, using wireless proximity transceiver 404 and wireless proximity transceiver 410.

Device pairing for wireless pairing communication (e.g., for communication to pair and communication after pairing) may be initiated based on the wireless proximity communication between first device 402 and second device 408. For example, first device 402 and second device 408 may engage in proximity-based communication (e.g., NFC) if/when first device 402 and second device 408 are within communication range. The wireless proximity communication may indicate that second device 408 is physically co-located with first device 402. The co-location indication may be used to initiate the automated pairing of the first and second devices 402, 408. For example, first device 402 may use the wireless proximity communication to initiate wireless pairing between first device 402 and second device 408 (e.g., if first and second devices 402, 408 are not already paired). In some examples, second device 408 may use the wireless proximity communication to provide a pairing address to first device 402. First device 402 may provide a temporary security key, which may be used to create a secure channel between the first and second devices 402, 408. A non-temporary security key for pairing may be provided by first device 402 to second device 408 over the secure channel. First and second devices 402, 408 may complete the automated pairing using the non-temporary security key in the wireless pairing communication.

FIG. 5 shows an example of a first device 502, a second device 514, and a bridge device 508 configured for automated pairing based on a proximity detection, according to an example embodiment. FIG. 5 shows an example of first devices 202, 302 and second devices 214, 312 in FIGS. 2 and 3 configured for automated pairing based on proximity communication with the support of a bridge device.

First device 502 may be any type of device, e.g., desktop computer, tablet computer, notebook computer, touch screen or pad, etc. First device 502 may include multiple transceivers. First device 502 may include wireless pairing transceiver 504, such as a wireless LAN or PAN transceiver, e.g., a Bluetooth® transceiver, a Zigbee® transceiver 506, a UWB transceiver, etc. First device 502 may include bridge transceiver 506. Bridge transceiver 506 may comprise a wired or wireless bridge transceiver, such as a wired or wireless LAN or PAN transceiver, e.g., a USB transceiver, a WiFi transceiver, an ethernet transceiver, a wireless pairing transceiver, such as a Bluetooth® transceiver, a Zigbee® transceiver, a UWB transceiver, etc.

Second device 514 may be any type of device, e.g., wireless keyboard, mouse, headphones, camera, printer, smart watch, smart phone, pen, speakers, etc. Second device 514 may perform pairing-based and proximity-based communication. Second device 514 may include wireless pairing transceiver 516. Wireless pairing transceiver 516 may be, for example, a Bluetooth® transceiver, a Zigbee® transceiver, a UWB transceiver, etc. Second device 514 may use wireless pairing transceiver 516 to engage in wireless pairing/paired communication with first device 502. Second device 514 may include wireless proximity transceiver 518. Wireless proximity transceiver 518 may be, for example, an NFC transceiver, an RFID transceiver, an ES transceiver, etc. Second device 514 may use wireless proximity transceiver 518 to engage in wireless proximity communication with bridge device 508.

Bridge device 508 may be any type of device, e.g., a smart phone, tablet, RFID scanner, TV remote control, keyboard surface, table surface, docking station, a mouse tracking pad, a digitizer, a connection mat, etc. Bridge device 308 may be configured or configurable to be authorized (e.g., by first device 502) to participate in the automated pairing of first and second devices 502, 514. Bridge device 508 may be authorized (e.g., paired with) first device 502, for example, before first device 502 is paired with second device 514. Bridge device 508 may include multiple transceivers. Bridge device 508 may include bridge transceiver 510. Bridge transceiver 510 may comprise a wired or wireless bridge transceiver, such as a wired or wireless LAN or PAN transceiver, e.g., a USB transceiver, a WiFi transceiver, an ethernet transceiver, a wireless pairing transceiver, such as a Bluetooth® transceiver, a Zigbee® transceiver, a UWB transceiver, etc. Bridge device 508 may include wireless proximity transceiver 512, such as an NFC transceiver, an RFID transceiver, an ES transceiver, etc., for example, for wireless proximity communication with second device 514.

First device 502 and second device 514 may engage in wireless pairing/paired communication via wireless pairing transceivers 504, 516. First device 502 and bridge device 514 may engage in wireless bridge communication via bridge transceivers 506, 510. Bridge device 508 and second device 514 may engage in wireless proximity communication via wireless proximity transceivers 512, 518. Proximity-based communication between second device 514 and bridge device 508 may indicate second device 514 is in close proximity to bridge device 508.

Device pairing for wireless pairing communication may be initiated based on the wireless proximity communication between second device 514 and bridge device 508 (e.g., if first and second devices 502, 514 are not already paired). For example, second device 514 and bridge device 508 may engage in proximity-based communication (e.g., NFC) if/when second device 514 and bridge device 508 are within wireless proximity communication range. The wireless proximity communication may indicate that second device 514 is physically co-located with bridge device 508. The co-location indication may be used to initiate the automated pairing of first and second devices 502, 514. For example, bridge device 508 may use the wireless proximity communication to initiate wireless pairing by performing a bridge communication with first device 502.

In some examples, second device 514 may provide a pairing address to bridge device 508 in a wireless proximity communication. Bridge device 508 may provide the pairing address of second device 514 to first device 502 in a bridge communication. First device 502 may provide a temporary security key to bridge device 508 in a bridge communication. Bridge device 508 may provide the temporary security key to second device 514. The temporary security key may be used to create a secure channel between first and second devices 502, 514 through bridge 508. A non-temporary security key for pairing may be provided by first device 502 to second device 514 over the secure channel through bridge 508. First and second devices 502, 514 may complete the automated pairing using the non-temporary security key in a wireless pairing communication.

Figure 6:
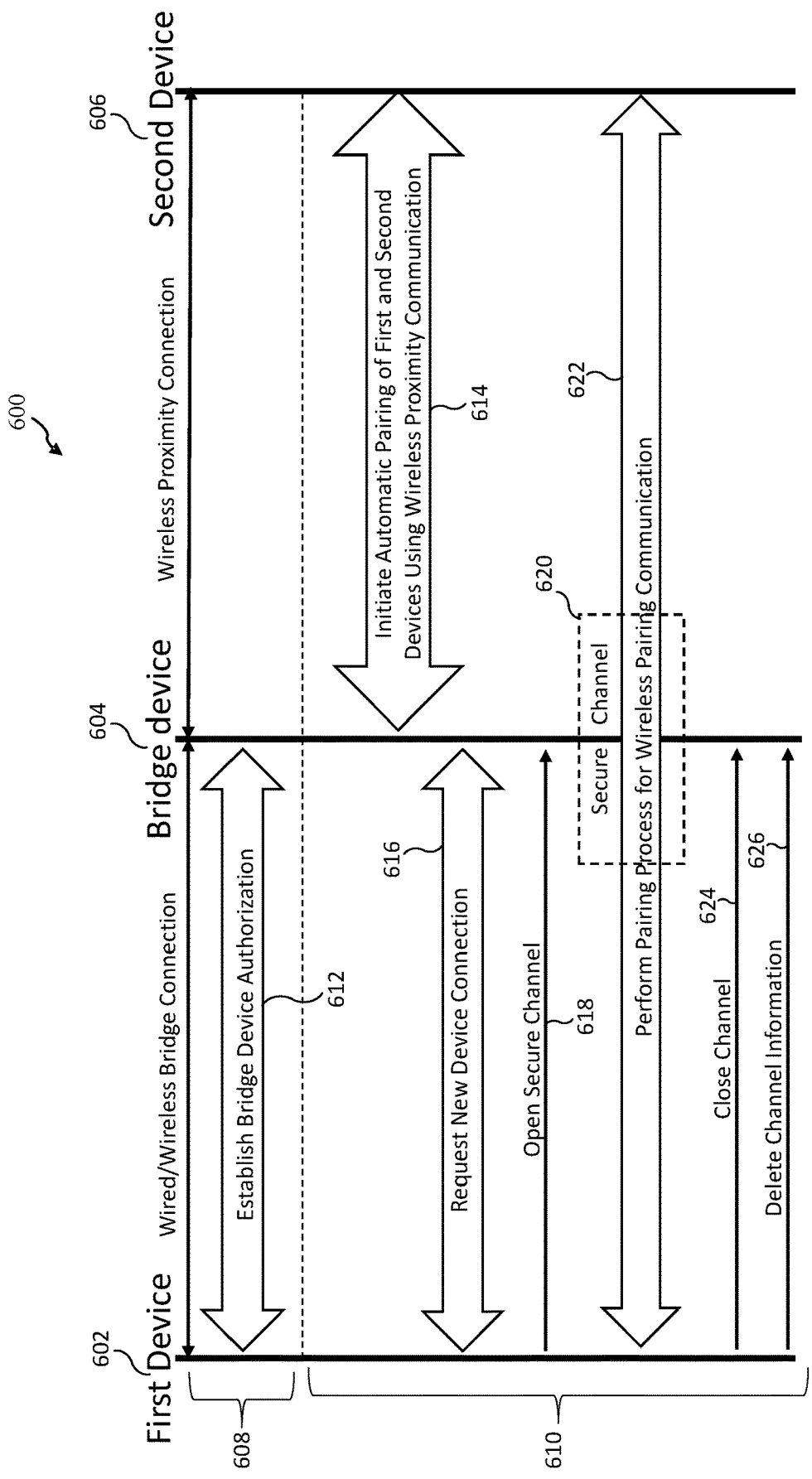
FIG. 6 shows an example of an interaction diagram for first, second and bridge devices configured for automated pairing based on a proximity detection, according to an example embodiment.

FIG. 6 shows an example of an interaction diagram for first, second and bridge devices configured for automated pairing based on a proximity detection, according to an example embodiment. Embodiments disclosed herein and other embodiments may operate in accordance with example method 600. Method 600 comprises steps 612-626. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

FIG. 6 shows one of many possible examples of the example operation described in other figures (e.g., FIGS. 1-5 and 7-9). FIG. 6 shows an example method using a bridge device, although other examples may be implemented with or without a bridge device. Example method 300 shows two phases, a bridge authorization phase 608 and an automated pairing phase 610.

As shown in the example interaction diagram of FIG. 6, in step 612 (e.g., in bridge authorization phase 608), a first device 602 may establish authorization for a bridge device 604 to participate in automated pairing of first device 602 with one or more second devices (e.g., a second device 606). In some examples, first device 602 may pair with wireless bridge device 604. Bridge device 604 may be configured to initiate automated pairing between first device 602 and second device(s) 606 based on wireless proximity communication(s) with second device(s) 606.

In step 614 (e.g., in automated pairing phase 610 of method 600), automated pairing of first and second devices 602, 606 may be initiated using a wireless proximity connection to communicate between second device 606 and bridge device 604. In some examples, bridge device 604 may initiate automated pairing based on the wireless proximity communication. Second device 606 may provide a wireless pairing address to bridge device 604. Second device 606 may perform the same behavior with bridge device 604 as second device 606 would perform with first device 602 without bridge device 604.

In step 616, bridge device 604 may use the bridge connection with first device 602 to communicate a request for a new device connection (e.g., for second device 606) to first device 602. The new connection request may include a wireless pairing address for second device 606. First device 602 may acknowledge the request.

In step 618, first device 602 may open a secure channel 620 with bridge device 604 to perform a portion of the automated pairing process with a level of security. For example, in providing a secret to second device 606, wireless proximity communication between bridge device 604 and second device 606 may prevent interception of the secret.

In step 622, first device 604 may provide a temporary security key to bridge device 604 in a bridge communication. Bridge device 604 may provide the temporary security key to second device 606. The temporary security key may be used to create secure channel 620 between first and second devices 602, 606 through bridge 604. First device 602 may provide a non-temporary security key for pairing to second device 606 over secure channel 620 through bridge device 604. First and second devices 602, 606 may perform the wireless pairing process for wireless pairing/paired communication without bridge device 604 using the non-temporary security key in a wireless pairing/paired communication.

In step 624, the secure channel opened between first device 602 and bridge device 604 may be closed (e.g., based on an indication from first device 602, such as after providing the non-temporary security key to second device 606 or after wirelessly pairing with second device 606).

In step 626, secure channel information (e.g., including the temporary security key) may be deleted. In some examples, first device 602 may change the temporary and non-temporary security keys, e.g., based on time (e.g., a time limit may be imposed on temporary and/or non-temporary security keys to limit the time in which second device 606 or an intercepting device may attempt to use the key(s)), which may improve security by preventing intercepts and/or using intercepts given that the key(s) are changed over time.

Figure 7:
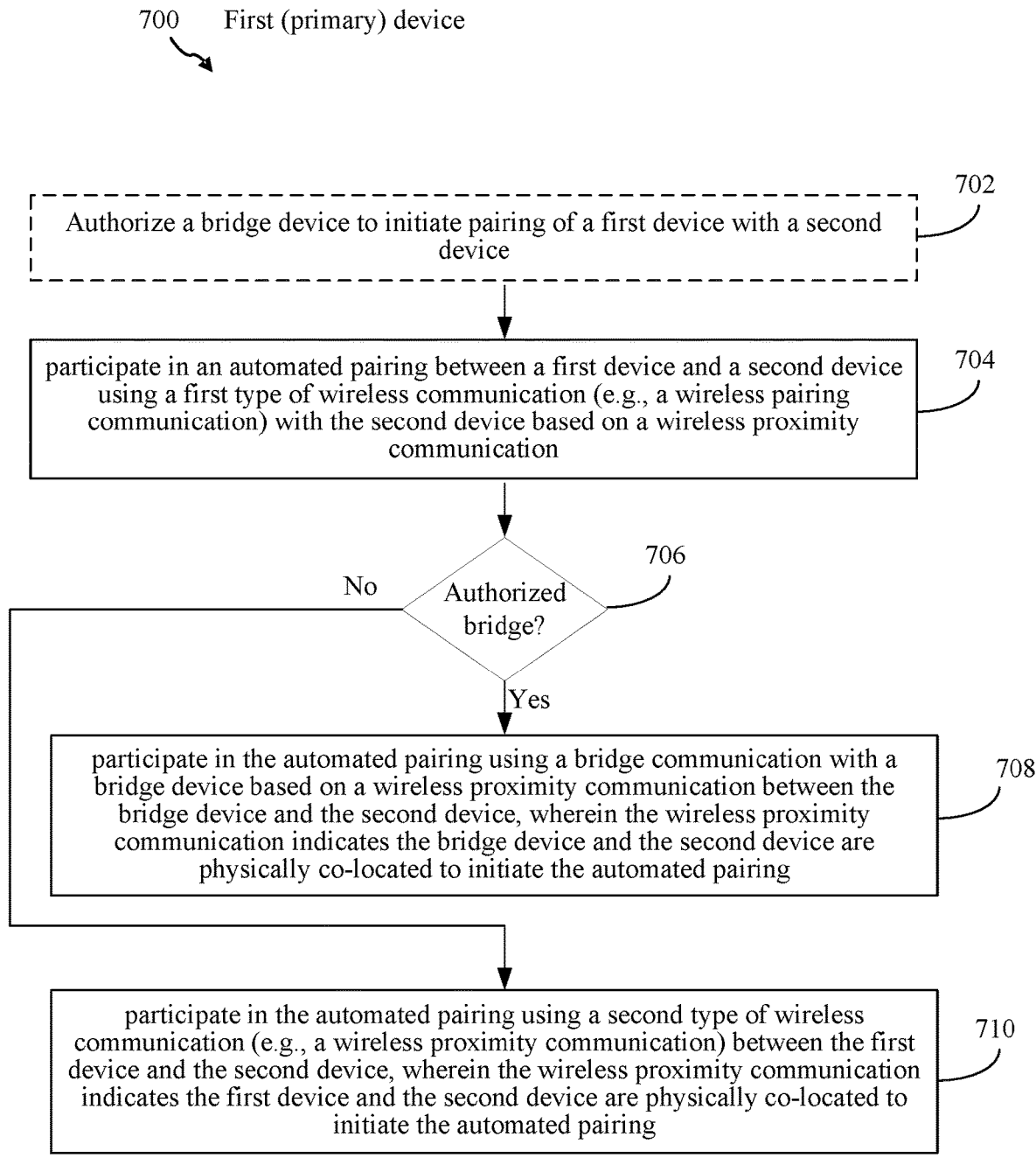
FIG. 7 shows an example of the operation of a first device configured for automated pairing, according to an example embodiment.

FIG. 7 shows an example of the operation of a first device configured for automated pairing, according to an example embodiment. FIG. 7 shows a flowchart of a method 700 for automated pairing, according to an example embodiment. Embodiments disclosed herein and other embodiments may operate in accordance with example method 700. Method 700 comprises steps 702-710, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 may (e.g., optionally) comprise step 702. In step 702, a first device may authorize a bridge device to initiate pairing of the first device with a second device. For example, as shown in FIG. 2, first device 202 may authorize bridge device 208 to participate in (e.g., initiate) automated pairing of first device 202 an second device 214.

In step 704, a first device may participate in an automated pairing between the first device and a second device using a first type of wireless communication (e.g., a wireless pairing communication) with the second device based on a wireless proximity communication. For example, as shown in FIG. 1, first device 116 may perform automated pairing with second device 108 (e.g., in position 108a) using wireless pairing communication 114a that is based on (e.g., in response to) wireless proximity communication 104 between first device 116 and second device 108. For example, as shown in FIG. 2, first device 202 may perform automated pairing with second device 214 using wireless pairing communication 212 that is based on (e.g., in response to) wireless proximity communication 206 between second device 214 and bridge device 208.

In step 706, a determination may be made as to whether a bridge device is authorized to participate in automated pairing. For example, as shown in FIG. 2, first device 202 may be aware whether bridge device 208 is authorized to participate in automated pairing, which determines whether second device 214 may be placed in proximity to bridge device 208 and/or in proximity to first device 202 for wireless proximity communication that will initiate automated pairing (e.g., and ultimately wireless pairing communication) between first device 202 and second device 214. In an example with multiple devices communicatively coupled to first device 202, placing second device 214 in proximity to devices that are not authorized to participate in automated pairing may not initiate automated pairing. For example, the devices may lack security and/or other configuration required by first device 202 to participate in automated pairing.

In step 708, if there is an authorized bridge device, then the first device may participate in the automated pairing using a bridge communication with the authorized bridge device based on a wireless proximity communication between the bridge device and the second device. The wireless proximity communication may indicate the bridge device and the second device are physically co-located. The co-location may be used to initiate the automated pairing. For example, as shown in FIG. 2, first device 202 may participate in the automated pairing using bridge communication 204 with authorized bridge device 208 based on wireless proximity communication 206 between bridge device 208 and second device 214. Wireless proximity communication 206 may indicate bridge device 208 and second device 214 are physically co-located. The co-location may be used to initiate the automated pairing of first and second devices 202, 214.

In step 710, the first device may participate in the wireless proximity communication using a second type of wireless communication (e.g., a wireless proximity communication) between the first device and the second device. The wireless proximity communication may indicate the first device and the second device are physically co-located. The co-location may be used to initiate the automated pairing. For example, as shown in FIG. 1, first device 116 may participate in wireless proximity communication 104 using a second type of wireless communication (e.g., wireless proximity communication) between the first device and the second device. The wireless proximity communication may indicate the first device and the second device are physically co-located. The co-location may be used to initiate the automated pairing.

Figure 8:
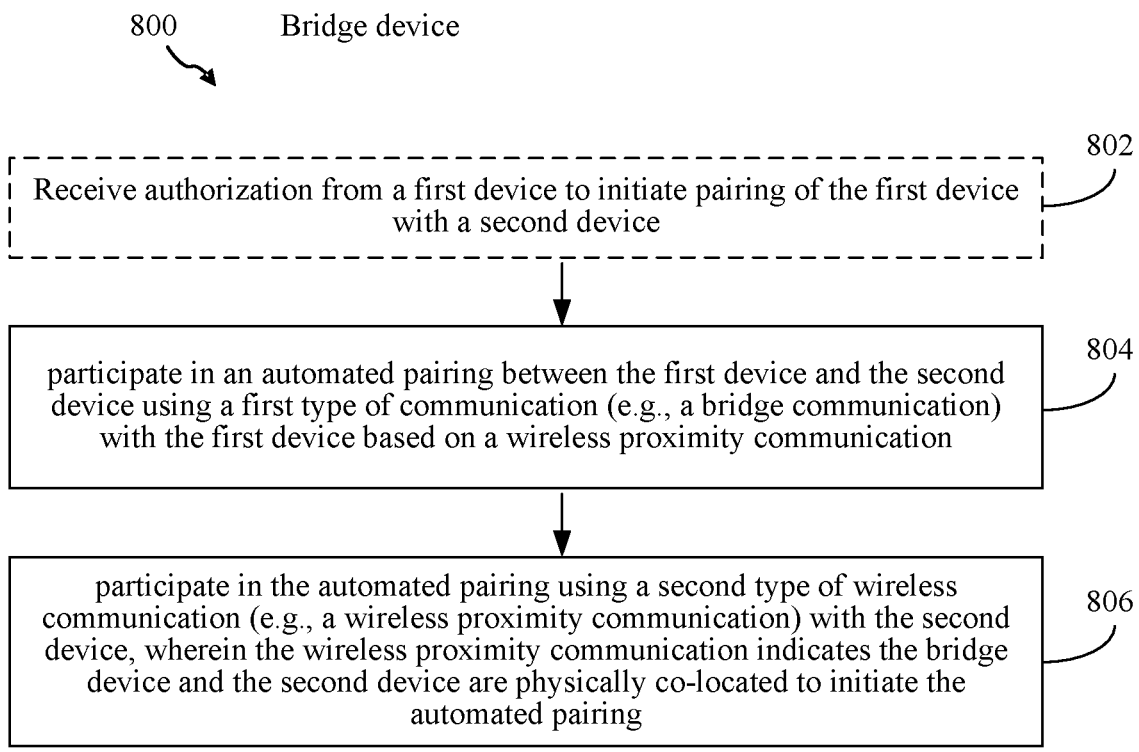
FIG. 8 shows an example of the operation of a bridge device configured for automated pairing, according to an example embodiment.

FIG. 8 shows an example of the operation of a bridge device configured for automated pairing, according to an example embodiment. FIG. 8 shows a flowchart of a method 800 for automated pairing, according to an example embodiment. Embodiments disclosed herein and other embodiments may operate in accordance with example method 800. Method 800 comprises steps 802-806, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Method 800 may (e.g., optionally) comprise step 802. In step 802, a bridge device may receive authorization from a first device to initiate pairing of the first device with a second device. For example, as shown in FIG. 2, For example, as shown in FIG. 2, bridge device 208 may receive from first device 202 authorization to participate in (e.g., initiate) automated pairing of first device 202 an second device 214.

In step 804, the bridge device may participate in an automated pairing between the first device and the second device using a first type of communication (e.g., a bridge communication) with the first device based on a wireless proximity communication. For example, as shown in FIG. 2, first device 202 may perform automated pairing with second device 214 using wireless pairing communication 212 that is based on (e.g., in response to) bridge communication 204 between bridge device 208 and first device 202, which is based on wireless proximity communication 206 between second device 214 and bridge device 208.

In step 806, the bridge device may participate in the automated pairing using a second type of wireless communication (e.g., a wireless proximity communication) with the second device. The wireless proximity communication may indicate the bridge device and the second device are physically co-located. The co-location may be used to initiate the automated pairing. For example, as shown in FIG. 2, bridge device 208 may initiate automated pairing by performing bridge communication 204 with first device 202 based on co-location indicated by wireless proximity communication 206 between second device 214 and bridge device 208.

Figure 9:
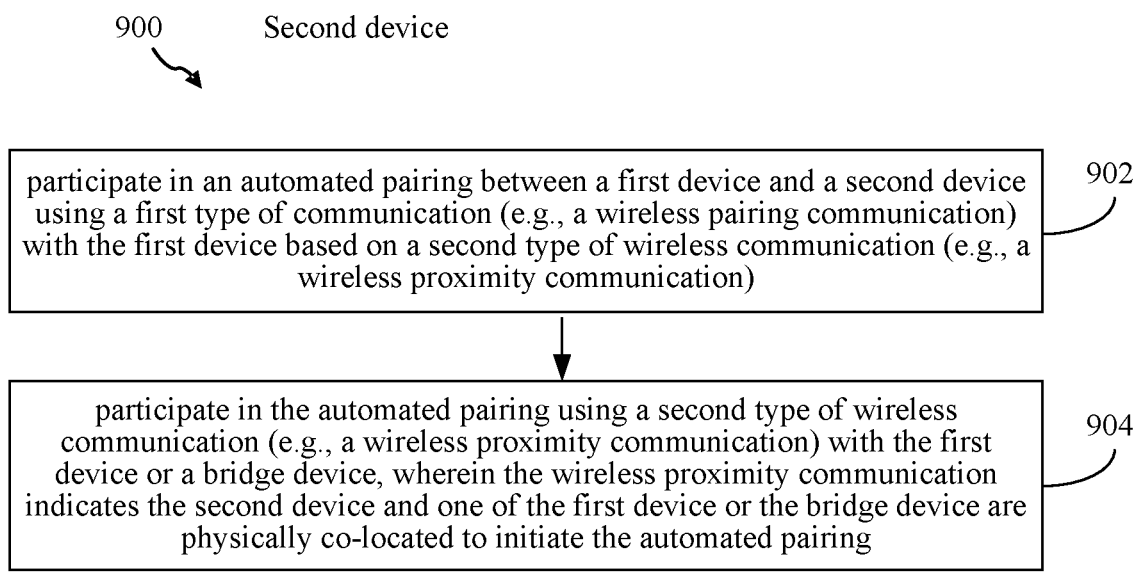
FIG. 9 shows an example of the operation of a second device configured for automated pairing, according to an example embodiment.

FIG. 9 shows an example of the operation of a second device configured for automated pairing, according to an example embodiment. FIG. 9 shows a flowchart of a method 900 for automated pairing, according to an example embodiment. Embodiments disclosed herein and other embodiments may operate in accordance with example method 900. Method 900 comprises steps 902-904, one or more of which are indicated as optional by dashed lines. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 9. FIG. 9 is simply one of many possible embodiments. Embodiments may implement fewer, more or different steps.

Method 900 may (e.g., optionally) comprise step 802. In step 902, a second device may participate in an automated pairing between a first device and a second device using a first type of communication (e.g., a wireless pairing communication) with the first device based on a second type of communication (e.g., wireless proximity communication). For example, as shown in FIG. 1, first device 116 may perform automated pairing with second device 108 (e.g., in position 108a) using wireless pairing communication 114a that is based on (e.g., in response to) wireless proximity communication 104 between first device 116 and second device 108. For example, as shown in FIG. 2, first device 202 may perform automated pairing with second device 214 using wireless pairing communication 212 that is based on (e.g., in response to) wireless proximity communication 206 between second device 214 and bridge device 208.

In step 904, the second device may participate in the automated pairing using a second type of wireless communication (e.g., a wireless proximity communication) with the first device or a bridge device. The wireless proximity communication may indicate the second device and one of the first device or the bridge device are physically co-located to initiate the automated pairing. For example, as shown in FIG. 1, second device 108 first device 116 may engage in wireless proximity communication 104, which may indicate second device 108 is physically co-located with first device 116. For example, as shown in FIG. 2, second device 214 and bridge device 208 may engage in wireless proximity communication 206, which may indicate second device 214 is physically co-located with bridge device 208.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
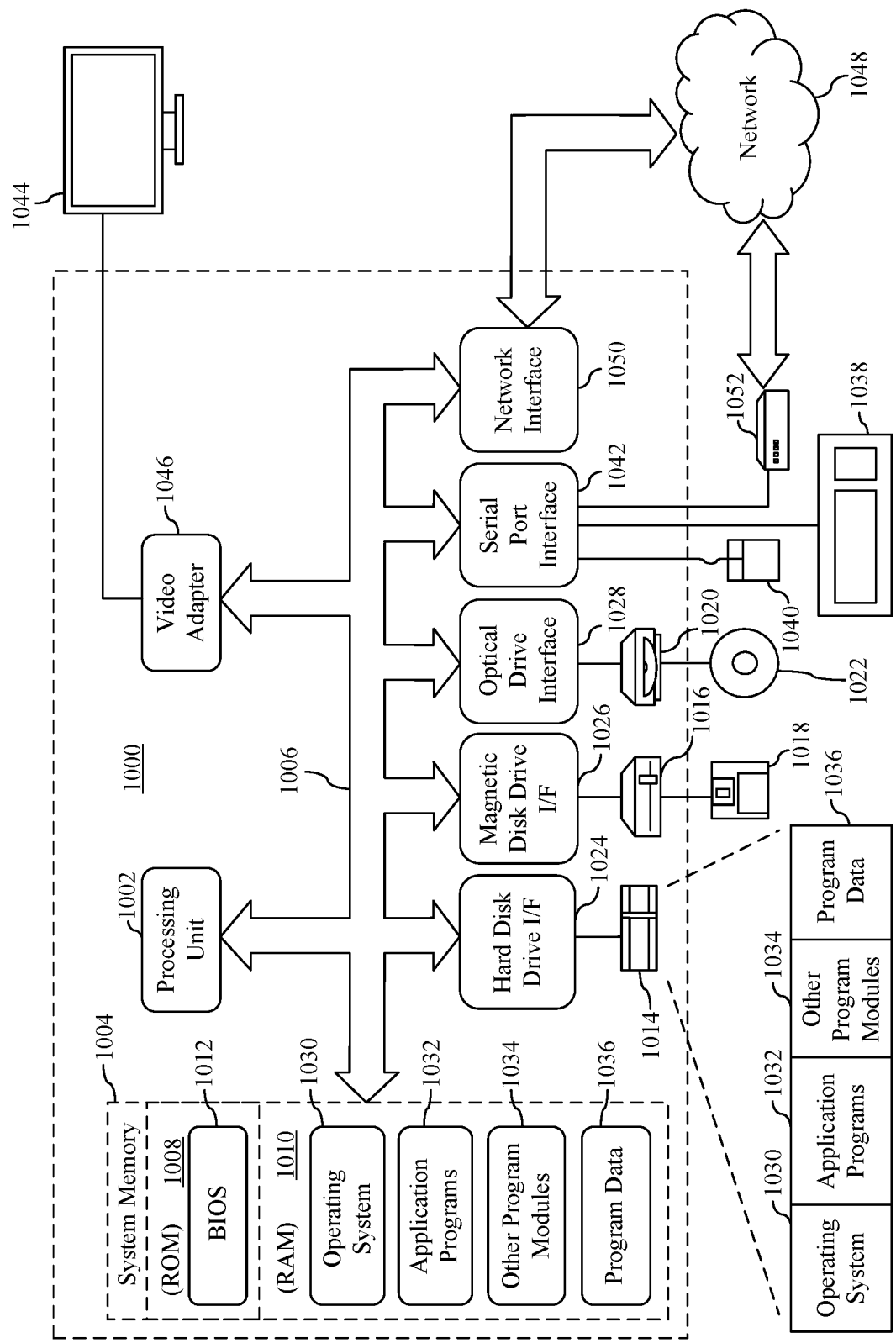
FIG. 10 shows a block diagram of an example computing device that may be used to implement example embodiments.

FIG. 10 shows an exemplary implementation of a computing device 1000 in which example embodiments may be implemented. Consistent with all other descriptions provided herein, the description of computing device 1000 is a non-limiting example for purposes of illustration. Example embodiments may be implemented in other types of computer systems, as would be known to persons skilled in the relevant art(s). As described in FIGS. 1-9, first, second and/or bridge devices, which may or may not be computing devices, may include wireless proximity transceivers, wireless pairing transceivers, and/or bridge transceivers.

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing example embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of example embodiments described herein. Accordingly, such computer programs represent controllers of the computing device 1000.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems, and computer program products are provided for automated pairing of devices based on a proximity detection. First and second devices may be automatically paired (e.g., without user involvement) for wireless communication (e.g., Bluetooth®), for example, based on proximity detection of the second device by the first device or a bridge device. A first (e.g., primary) device may authorize (e.g., pair with) one or more (e.g., wired or wireless) bridge devices to participate (e.g., initiate) pairing of the first device with one or more second devices. The first device or the bridge device may engage in a wireless proximity communication with one or more second (e.g., secondary) devices, indicating that the second device(s) is(are) physically co-located with the first device or bridge device. The co-location indication may be used to initiate the automated pairing of the first and second devices. The second device may provide a pairing address to the first device (e.g., through the bridge device). The first device may provide a temporary security key, which may be used to create a secure channel between the first and second devices (e.g., through the bridge device). A non-temporary security key for pairing may be provided by the first device to the second device (e.g., through the bridge device) over the secure channel. The first and second devices may complete the automated pairing using the non-temporary security key. Time limits may be imposed on the temporary and/or non-temporary security keys.

In examples, a first device (e.g., a primary device) may be configured to participate in automated pairing (e.g., without user involvement) between the first device and a second device. The first device may comprise a first transceiver configured to participate in the automated pairing using a first type of wireless communication (e.g., wireless pairing communication, such as Bluetooth®) with the second device based on (e.g., in response to) a wireless proximity communication. The first device may (e.g., also) comprise at least one of a bridge transceiver and/or a second transceiver. A bridge transceiver may be configured to participate in the automated pairing using a bridge communication with a bridge device based on the wireless proximity communication between the bridge device and the second device, wherein the wireless proximity communication indicates the bridge device and the second device are physically co-located to initiate the automated pairing. A second transceiver may be configured to participate in the automated pairing using a second type of wireless communication (e.g., wireless proximity communication) with the second device, wherein the wireless proximity communication indicates the first device and the second device are physically co-located to initiate the automated pairing.

In examples, the first transceiver may comprise a pairable wireless LAN or PAN transceiver, such as a Bluetooth® transceiver or a Zigbee® transceiver. The bridge transceiver may comprise, for example, a wired or wireless LAN or PAN transceiver, such as a universal serial bus (USB) transceiver, a wireless fidelity (WiFi) transceiver, an ethernet transceiver, a Bluetooth® transceiver, or a Zigbee® transceiver. The second transceiver may comprise, for example, a near-field communication (NFC) transceiver, a radio frequency identification (RFID) transceiver, or an electrostatic (ES) transceiver.

In examples, the first device may comprise the second transceiver.

In examples, the first device may comprise the bridge transceiver. The first device may be configured or configurable to authorize the bridge device to participate in the automated pairing.

In examples, first device may be configured to receive a pairing address from the second device or the bridge device (e.g., in a pairing message).

In examples, the first device may be configured to provide a temporary security key to the second device (e.g., through the bridge device), for example, in a secure channel message.

In examples, the first device may be configured to provide a non-temporary security key to the second device (e.g., through the bridge device) over a secure channel based on the temporary key. The first device may be configured to complete the automated pairing using the non-temporary key.

In example, the first device may be configured to change or impose a time limit on at least one of the temporary key and the non-temporary key over time (e.g., periodically and/or aperiodically).

In examples, an automated pairing bridge device may be configured to participate in automated pairing (e.g., without user involvement) between a first device and a second device. The automated pairing bridge device may comprise a first transceiver configured to participate in the automated pairing using a first type of communication (e.g., a bridge communication) with the first device based on (e.g., in response to) a wireless proximity communication. The automated pairing bridge device may comprise a second transceiver configured to participate in the automated pairing using a second type of communication (e.g., wireless proximity communication) with the second device. The wireless proximity communication may indicate the automated pairing bridge device and the second device are physically co-located to initiate the automated pairing.

In examples, the first transceiver may comprise a LAN or PAN transceiver, such as a USB transceiver, a WiFi transceiver, an ethernet transceiver, a Bluetooth® transceiver, or a Zigbee® transceiver. The second transceiver may comprise an NFC transceiver, an RFID transceiver, or an ES transceiver.

In examples, the automated pairing bridge device may be configured or configurable (e.g., to be authorized by the first device) to participate in the automated pairing.

In examples, the automated pairing bridge device may be configured to receive a pairing address from the second device and provide the pairing address to the first device (e.g., in a pairing message).

In examples, the automated pairing bridge device may be configured to receive a temporary security key from the first device and provide the temporary security key to the second device (e.g., in a secure channel message).

In examples, the automated pairing bridge device may be configured to provide a secure channel using the temporary key for communication of a non-temporary security key from the first device to the automated pairing bridge device and from the automated pairing bridge device to the second device.

In examples, the automated pairing bridge device may be configured to initiate the automated pairing with the first device in response to detecting the second device based on the wireless proximity communication.

In examples, a second (e.g., secondary or accessory) device may be configured to participate in automated pairing (e.g., without user involvement) between a first device and the second device. The second device may comprise a first transceiver configured to participate in the automated pairing using a first type of wireless communication (e.g., wireless pairing communication) with the first device based on (e.g., in response to) a wireless proximity communication. The second device may comprise a second transceiver configured to participate in a second type of wireless communication (e.g., the wireless proximity communication) using a second type of wireless communication (e.g., wireless proximity communication) with the first device or a bridge device. The wireless proximity communication may indicate the second device and one of the first device or the bridge device are physically co-located to initiate the automated pairing.

In examples, the first transceiver may comprise a LAN or PAN transceiver, such as a Bluetooth® transceiver or a Zigbee® transceiver. The second transceiver may comprise an NFC transceiver, an RFID transceiver, or an ES transceiver.

In examples, the second device may be configured to provide a pairing address to the first device (e.g., via the bridge device), for example, in a pairing message.

In examples, the second device may be configured to receive a temporary security key from the first device (e.g., through the bridge device), for example, in a secure channel message (e.g., a request).

In examples, the second device may be configured to receive a non-temporary security key from the first device (e.g., through the bridge device) over a secure channel based on the temporary key, and to complete the automated pairing using the non-temporary key.

V. Conclusion

While various examples have been described above, it should be understood that they have been presented by way of example only, and not limitation. It will be understood by those skilled in the relevant art(s) that various changes in form and details may be made therein without departing from the spirit and scope of the present subject matter as defined in the appended claims. Accordingly, the breadth and scope of the present subject matter should not be limited by any of the above-described examples, but should be defined only in accordance with the following claims and their equivalents.

What is claimed is:

1. A first device configured to participate in automated pairing between the first device and a second device, the first device comprising:
   a first transceiver configured to participate in the automated pairing using a wireless pairing communication with the second device; and
   a second transceiver configured to participate in the automated pairing using a wireless proximity communication with the second device, wherein the wireless proximity communication indicates the first device and the second device are physically co-located to initiate the automated pairing,
   wherein the first device is configured to:
      transmit pairing information to the second device over wireless proximity communication using the second transceiver, and
      pair with the second device over wireless pairing communication using the first transceiver.

2. The first device of claim 1,
   wherein the first transceiver comprises a Bluetooth transceiver or a Zigbee transceiver;
   and
   wherein the second transceiver comprises a near-field communication (NFC) transceiver, a radio frequency identification (RFID) transceiver, or an electrostatic (ES) transceiver.

3. The first device of claim 1, wherein the first device is configured to receive a pairing address from the second device.

4. The first device of claim 1, wherein the first device is configured to provide a temporary security key to the second device.

5. The first device of claim 4, wherein the first device is configured to provide a non-temporary security key to the second device over a secure channel based on the temporary key; and to complete the automated pairing using the non-temporary key.

6. The first device of claim 1, wherein the pairing information comprises a non-temporary security key.

7. The first device of claim 1, wherein the first device is further configured to: establish a secure channel over a direct communication between the first device and the second device, wherein the pairing information is transmitted to the second device over the secure channel.

8. A first device configured to participate in automated pairing between the first device and a second device, the first device comprising:
   a first transceiver configured to participate in the automated pairing using a wireless pairing communication with the second device; and
   at least one of the following:
      a bridge transceiver configured to participate in the automated pairing using a bridge communication with a bridge device based on a wireless proximity communication between the bridge device and the second device, wherein the wireless proximity communication indicates the bridge device and the second device are physically co-located to initiate the automated pairing; or
      a second transceiver configured to participate in the automated pairing using a wireless proximity communication with the second device, wherein the wireless proximity communication indicates the first device and the second device are physically co-located to initiate the automated pairing, wherein the first device is configured to:

provide a temporary security key to the second device, provide a non-temporary security key to the second device over a secure channel based on the temporary key, change or impose a time limit on at least one of the temporary key and the non-temporary key over time, and complete the automated pairing using the non-temporary key.

9. An automated pairing bridge device configured to participate in automated pairing between a first device and a second device, the automated pairing bridge device comprising:

a first transceiver configured to participate in the automated pairing using a wireless pairing communication with the first device; and a second transceiver configured to participate in the automated pairing using a wireless proximity communication with the second device, wherein the wireless proximity communication indicates the automated pairing bridge device and the second device are physically co-located to initiate the automated pairing, wherein the automated pairing bridge device is configured to provide a secure channel for communication of a non-temporary security key from the first device to the automated pairing bridge device and from the automated pairing bridge device to the second device.

10. The automated pairing bridge device of claim 9, wherein the first transceiver comprises a universal serial bus (USB) transceiver, a wireless fidelity (WiFi) transceiver, an ethernet transceiver, a Bluetooth transceiver, or a Zigbee transceiver; and wherein the second transceiver comprises a near-field communication (NFC) transceiver, a radio frequency identification (RFID) transceiver, or an electrostatic (ES) transceiver.

11. The automated pairing bridge device of claim 9, wherein the automated pairing bridge device is configured or configurable to participate in the automated pairing.

12. The automated pairing bridge device of claim 9, wherein the automated pairing bridge device is configured to receive a pairing address from the second device and provide the pairing address to the first device.

13. The automated pairing bridge device of claim 9, wherein the automated pairing bridge device is configured to receive a temporary security key from the first device and provide the temporary security key to the second device, wherein the temporary security key is used to establish the secure channel.

14. The automated pairing bridge device of claim 9, wherein the automated pairing bridge device is configured to initiate the automated pairing with the first device in response to detecting the second device based on the wireless proximity communication.

15. A second device configured to participate in automated pairing between a first device and the second device, the second device comprising:

a first transceiver configured to participate in the automated pairing using a wireless pairing communication with the first device; and a second transceiver configured to participate in the automated pairing using a wireless proximity communication with the first device, wherein the wireless proximity communication indicates the second device and the first device are physically co-located to initiate the automated pairing, wherein the second device is configured to:

receive pairing information from the first device over wireless proximity communication using the second transceiver, and pair with the first device over wireless pairing communication using the first transceiver.

16. The second device of claim 15, wherein the first transceiver comprises a Bluetooth transceiver or a Zigbee transceiver;

wherein the second transceiver comprises a near-field communication (NFC) transceiver, a radio frequency identification (RFID) transceiver, or an electrostatic (ES) transceiver.

17. The second device of claim 15, wherein the second device is configured to provide a pairing address to the first device.

18. The second device of claim 15, wherein the second device is configured to receive a temporary security key from the first device.

19. The second device of claim 18, wherein the second device is configured to receive a non-temporary security key from the first device over a secure channel based on the temporary key, and to complete the automated pairing using the non-temporary key.

20. The second device of claim 15, wherein the pairing information comprises a non-temporary security key.

* * * * *